United States Patent [19]

Belart

[11] 4,340,257
[45] Jul. 20, 1982

[54] HYDRAULIC BRAKE SYSTEM

[75] Inventor: Juan Belart, Walldorf, Fed. Rep. of Germany

[73] Assignee: ITT Industries, Inc., New York, N.Y.

[21] Appl. No.: 205,499

[22] Filed: Nov. 10, 1980

[51] Int. Cl.³ .............................................. B60T 8/02
[52] U.S. Cl. .................................. 303/114; 188/345; 303/119
[58] Field of Search ................. 303/113–119, 303/50–56, 10–12, 6, 68–69; 188/181, 345, 151, 359; 91/391; 60/551, 552, 548

[56] References Cited

U.S. PATENT DOCUMENTS

| | | | |
|---|---|---|---|
| 3,827,759 | 8/1974 | Belart | 303/114 |
| 3,877,756 | 4/1975 | Inada et al. | 303/114 |
| 3,942,844 | 3/1976 | Inada et al. | 303/114 X |
| 3,979,153 | 9/1976 | Ingram et al. | 303/114 X |

Primary Examiner—Douglas C. Butler
Attorney, Agent, or Firm—John T. O'Halloran; Alfred C. Hill

[57] ABSTRACT

Hydraulic brake systems are known including a master cylinder, wheel brake cylinder and antiskid control apparatus in which a fluid flow from a fluid source to the pressure chamber of the master cylinder is controlled by a valve device. The antiskid control apparatus activate valves to modulate the pressure in the associated wheel cylinders in the event of an imminent locked condition of a wheel. The known valve devices are complicated and do not permit determining the operability of the brake system before reaching a change-over point. To obviate these disadvantages, the valve device of the present invention feeds pressure from an auxiliary circuit in case of a corresponding decline in pressure from the master cylinder to the wheel cylinders. In the inactive state of the valve device, a pressure fluid connection is opened between a chamber defined by a booster piston and a fluid reservoir and this connection is closed upon actuation of the valve device, i.e. pressure is built up in a chamber locates at the end of the booster piston which has a closed connection to the valve device.

47 Claims, 4 Drawing Figures

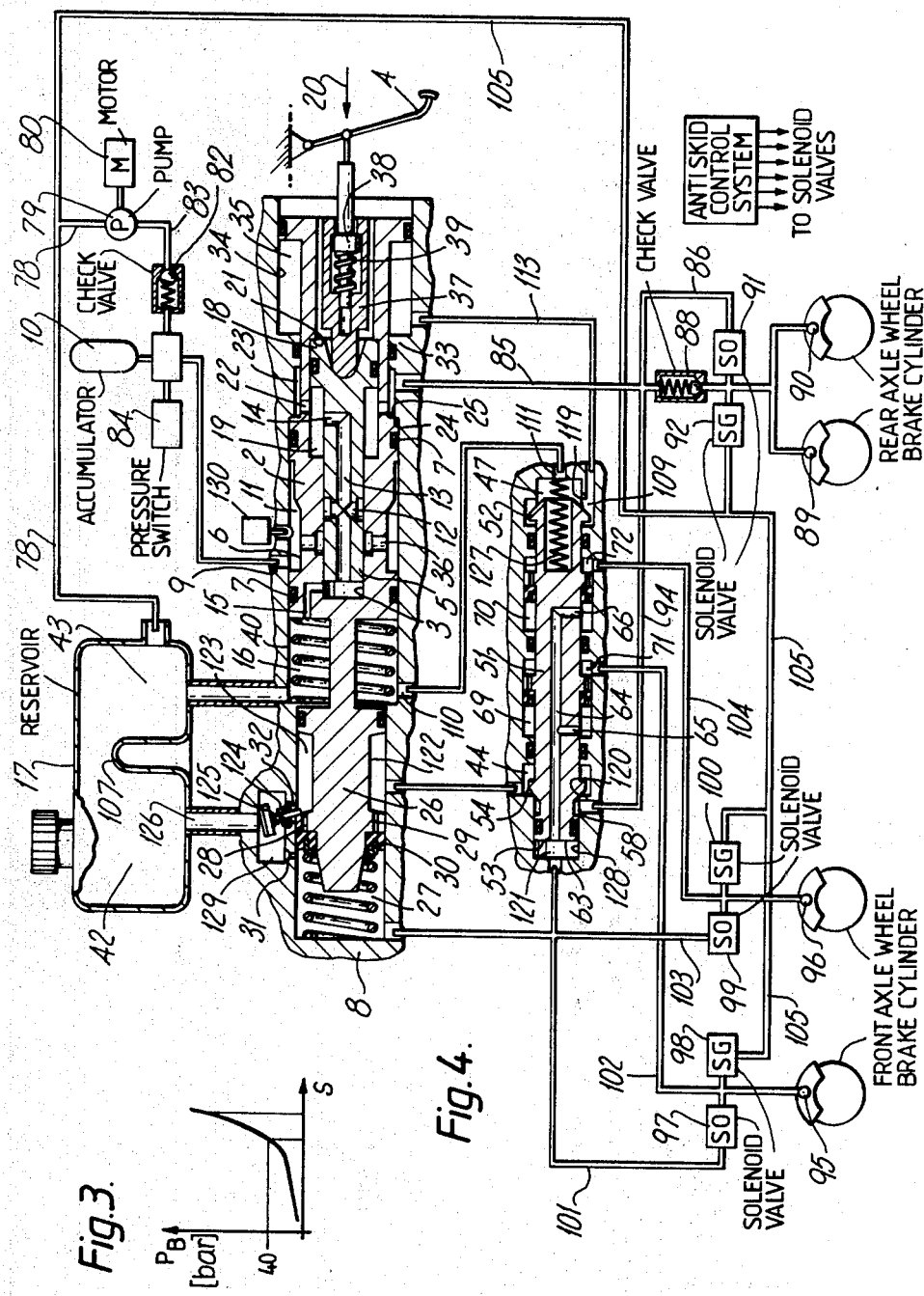

HYDRAULIC BRAKE SYSTEM

BACKGROUND OF THE INVENTION

The present invention relates to a hydraulic brake system comprising a master brake cylinder, wheel brake cylinders, a brake slip or antiskid control apparatus, a valve device controlling a fluid flow from a fluid source to a pressure chamber of the master cylinder, and valves actuated by the brake slip control apparatus controlling in the event of an imminent locked condition of a wheel the pressure in the associated wheel cylinder independently of the pressure chamber, the valve device being opened dependent on a differential of pressure between the pressure in the pressure chamber and the pressure in the wheel cylinder associated with the pressure chamber, the pressure in the wheel cylinder being required to be lower than the pressure in the pressure chamber by a predetermined amount.

In a copending U.S. patent application of J. Belart, Ser. No. 193,215, filed Oct. 2, 1980, disclosed, which provides for locking of the hydraulic booster piston only if the change-over pressure at which the static system is switched to the dynamic system is attained. Below this change-over point the booster piston will not be locked in position with the brake slip control apparatus in operation, so that even with additional fluid supply from the dynamic circuit into the static circuit, movement of the brake pedal through its full travel cannot be prevented.

SUMMARY OF THE INVENTION

An object of the present invention is to simplify and improve upon the brake system of the above-cited copending application. In particular, the object is to obtain a hydraulically locked condition of the booster piston also below the change-over point and to maintain the brake system checking capability prior to attainment of the change-over point.

A feature of the present invention is the provision of a hydraulic brake system comprising; a master brake cylinder having a pressure chamber and a master cylinder piston; a brake booster having a booster piston coupled to the master cylinder piston to pressurize the pressure chamber; wheel brake cylinders; antiskid control apparatus including solenoid valves coupled to the wheel cylinders to control, in the event of an imminent locked condition of a wheel, the pressure in an associated one of the wheel cylinders independently of the pressure in the pressure chamber; a valve device coupled to the pressure chamber, the brake booster, certain ones of the solenoid valves and certain ones of the wheel cylinders, the valve device being opened dependent on a differential of pressure between the pressure in the pressure chamber and the certain ones of the wheel cylinders, the pressure in the certain ones of the wheel cylinders being lower than the pressure in the pressure chamber by a predetermining amount, the valve device interrupting a fluid connection between a fluid chamber associated with one end of the booster piston, and an unpressurized fluid reservoir when the valve device is opened, the fluid chamber being disposed relative to the one end of the booster piston such that the booster piston reduces the volume of the fluid chamber when moved in an actuating direction.

Because of the integration of another valve function in the valve device, the provision of a special valve for hydraulically locking the booster piston in position may be dispensed with. The diameter of the hydraulic brake booster thus remains unchanged. A favorable construction of the valve device is obtained by the valve device comprising a stepped valve piston movably arranged in a housing parallel to the master cylinder. The parallel arrangement results in a very low height of construction, and components can be saved by the provision of only one valve piston fulfilling several functions. Advantageously, the housing of the valve device is formed integral with the master cylinder housing, thereby obviating the necessity of providing additional mounts. Further, this arrangement enables specific fluid connections between the valve device and the master cylinder to be constructed as bores or channels in the housing so that the fluid lines needed otherwise can be saved. At the same time, potential sources of failure due to leaks are eliminated.

In order to provide several control chambers for the valve piston, the housing of the valve device is subdivided into several chambers arranged axially in series and having the valve piston extending through their partition walls in a sealed relationship thereto, with the valve piston extending into the first and last chamber of the arrangement. Thus, as a result of the effects of pressure in a chamber, the axial movement of the valve piston permits several functions to be executed in other chambers. The valve piston suitable has a collar subdividing each chamber into an inlet chamber communicating with the pressure chamber and a control chamber communicating with the wheel cylinder. This simple design ensures that a check valve opening in the direction of the inlet chamber can be provided between inlet chamber and control chamber, the check valve being suitably formed by a bore in the collar whose opening terminating in the inlet chamber is covered by a seal sealing the collar to the housing. This design affords a simple, fluid-tight separation of a chamber into inlet and control chambers. In order to connect the inlet chambers with the fluid chamber, channels are advantageously provided in the valve piston which extend from the end thereof largely coaxially through the valve piston. This also enables the wheel cylinders associated with the master cylinder pressure chamber to be directly connected to the inlet chamber, with this connection being interruptible by a valve.

In order to utilize the multiple valve function of the valve piston, an inlet or outlet opening adapted to be closed by the valve piston is designed as a valve seat in the first and last one of the fluid-containing chambers arranged axially in series. The first chamber is suitably connected to the pressure chamber and to the fluid flow from the fluid source, with the valve piston closing the inlet opening of the pressure chamber by a seating engagement with its valve seat. The most favorable spatial arrangement is obtained by connecting the last chamber to the chamber bounded by the booster piston and to the unpressurized fluid reservoir, with the inlet of the chamber bounded by the booster piston being adapted to be closed by the end of the valve piston extending into that chamber. Because the last chamber is in the immediate proximity of the hydraulic booster and the first chamber is in the immediate proximity of the pressure chamber, part of the connections can be provided by bores in the housing, and the length of the remaining fluid lines required is as small as possible.

If a valve is constructed such that the valve piston acts as a slide valve closing the radial inlet of the chamber bounded by the booster piston by moving axially, the relatively high pressure building up in the chamber with continued actuation will not be able to act on the valve piston so as to have any effect on the valve function. Because the forces effecting the valve function act only axially and the valve piston closes the radial inlet by moving axially, the pressure developing in the inlet opening will be allowed to act on the piston only radially. A safe valve function is thereby ensured.

Because the first chamber of the valve device which is connected to the fluid source is bounded by a piston having the valve piston extending therethrough axially movably and having acting on it a spring in opposition to the pressure of the fluid source, with the valve piston's end lying in the first chamber being slightly larger in diameter than the valve piston's section extending through the piston, an emergency device is provided which, in the event of a failure of the hydraulic booster circuit, exerts an additional force on the valve piston in the closing direction. If the dynamic circuit fails, the spring force will urge the piston into abutment with the larger, stepped end section of the valve piston, thereby transmitting an additional force to the valve piston.

Advantageously, a stop is provided in the first chamber for abutting engagement with the piston acted upon by the pressure of the fluid source. In this manner, damage to the spring is avoided.

If the chamber founded by the piston and having the valve piston extending therethrough is connected to atmosphere, its one purpose may be to accommodate the spring engaged between the piston and the subsequent partition wall, while it fulfills at the same time the function of a leakage chamber. In the event of leakages of the pressure chamber bounded by the piston, fluid will escape through connection to atmosphere, and seal leakage will become visible to the eye.

If each wheel cylinder allocated to the master cylinder is assigned an inlet chamber and a control chamber which are provided between the first and the last chamber of the valve device, any number of wheel cylinders allocated to the master cylinder are pressure-controllable independently of each other.

In another embodiment of a valve, the valve piston carries a collar which is designed as a valve cone and urged into sealing engagement with a valve seat to interrupt the connection of the fluid flow to the master cylinder pressure chamber. Such an arrangement permits a more simple, pressure-balanced valve, enabling the effective surfaces acted upon by pressure to be determined with greater accuracy. If the valve cone is pressure-balanced, it may be left out completely in the calculation of the change-over point, for instance.

By providing for the one end of the valve piston to slide in the housing in a fluid-sealed relationship thereto and to bound a chamber pressurized by the master cylinder pressure, it is possible to calculate and provide change-over point simply and accurately by dimensioning effective diameter of the one end of the valve piston.

Another possibility of supplying fluid to the pressure chamber of the master cylinder is provided by directing the fluid through a chamber arranged in the circumference of the master cylinder piston and connected to the pressure chamber via a check valve opening in the direction of the pressure chamber. Such an arrangement ensures a smooth adaptation of the pressure in the pressure chamber to the pressure of the dynamic brake circuit. In the inactive position of the master cylinder piston, the chamber is advantageously connected to the unpressurized fluid reservoir via a valve actuated by the master cylinder piston. This ensures that even in the cut-off state of the fluid connection, the cut-off chambers are fully charged with fluid. In a simple embodiment, the valve is a tip-change valve acted upon in the closing direction by a spring.

In an embodiment incorporating a tandem master cylinder, each pressure chamber may be assigned a self-contained valve device of its own, with the arrangement of the one valve device which interrupts the fluid connection acting parallel to the arrangement of the other valve device. It is hereby achieved that only the master cylinder chamber concerned is connected to the dynamic circuit and that the booster piston is hydraulically locked in position only if both master cylinder chambers are connected to the dynamic circuit.

Advantageously, the spring, which determines the pressure at which change-over to the dynamic system of the booster takes place and keeps the valve cone in seating engagement with the valve seat in the first chamber, is situated in a control chamber so that the spring is engaged between the collar of the valve piston and the subsequent partition wall towards the next chamber. Here, a helical spring could be used which when compressed requires only little space. If the spring is arranged in a control chamber in this manner, its end located in the last chamber may at the same time be constructed such that the end of the valve piston and the wall opposite this end are relatively spaced so as to limit the valve travel.

Another advantageous arrangement for accomodating the spring determining the change-over pressure is obtained by arranging the spring coaxially in a bore in an end of the valve piston, the spring bearing against the wall opposite the bore, thereby acting upon the valve piston in the closing direction.

BRIEF DESCRIPTION OF THE DRAWING

Above-mentioned and other features and objects of this invention will become more apparent by reference to the following description taken in conjunction with the accompanying drawing, in which:

FIG. 3 is a graph showing the pressure versus travel characteristic of a master cylinder constructed in accordance with the principal of the present invention; and FIG. 4 is a longitudinal cross sectional view of the hydraulic brake system of FIG. 1 with a modified valve device.

DESCRIPTION OF THE PREFERRED EMBODIMENT

Figure 1:
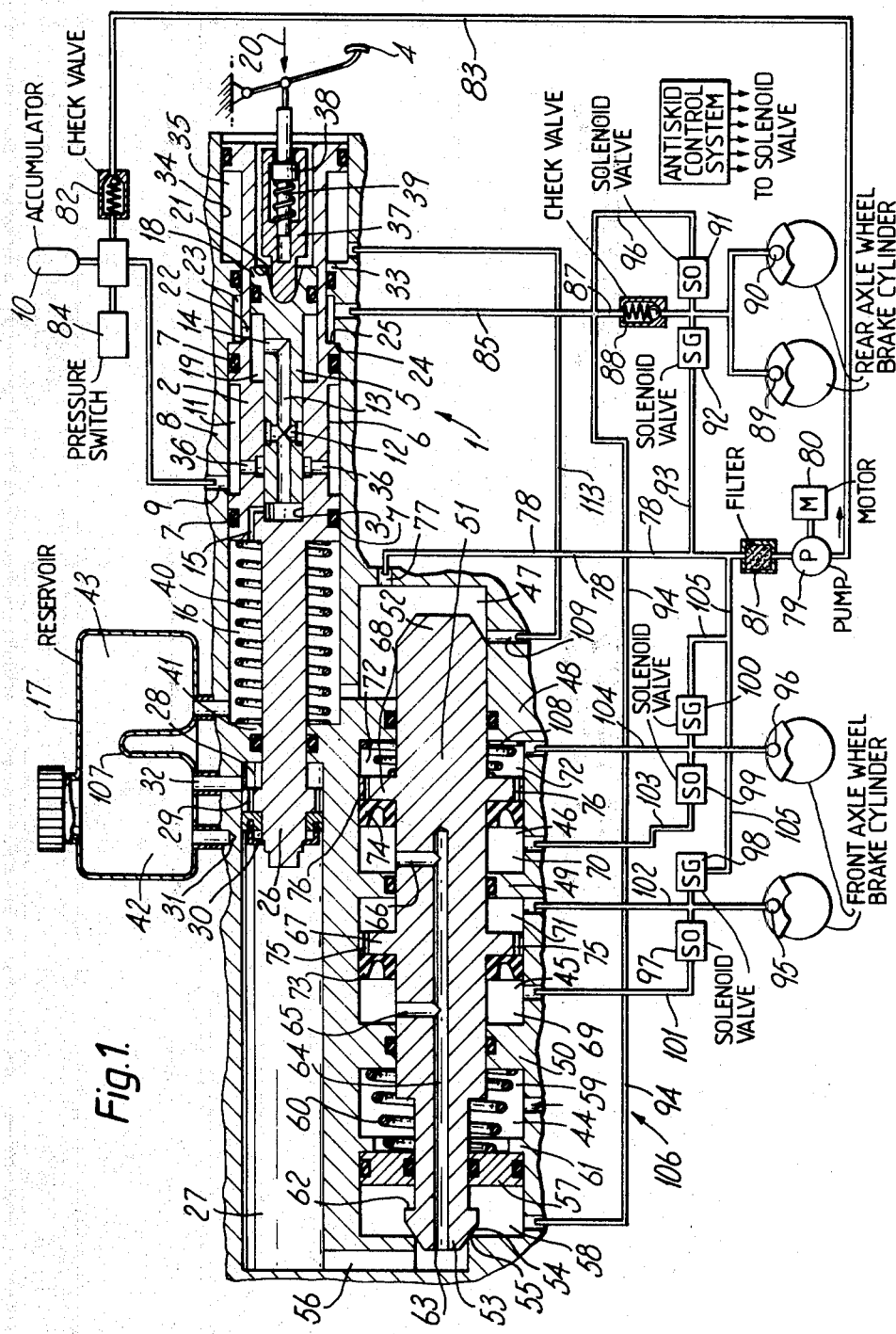
FIG. 1 is a longitudinal cross sectional view of a hydraulic brake system in accordance with the principles of the present invention having a master cylinder and hydraulic booster with a valve device arranged parallel thereto.
Figure 2:
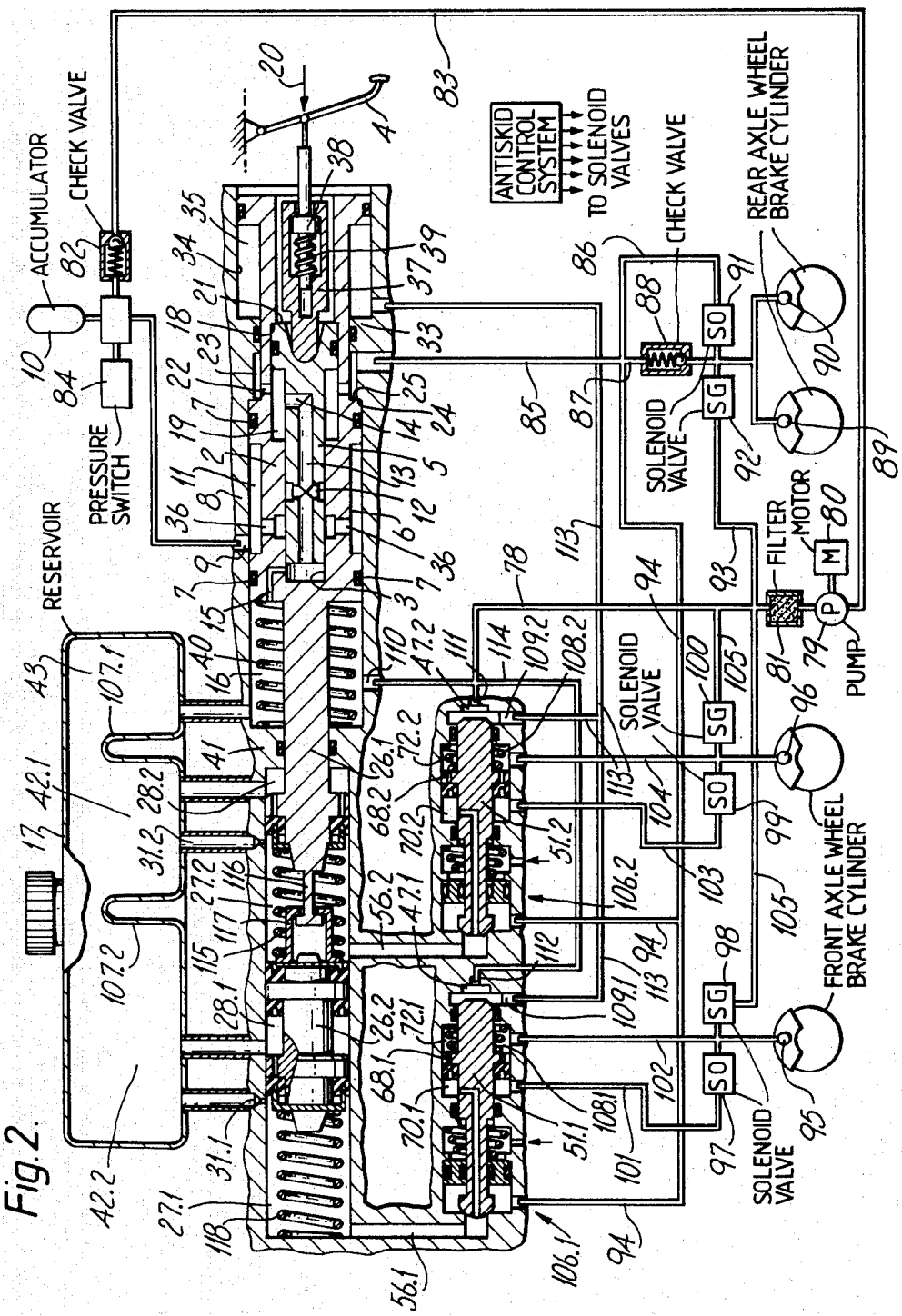
FIG. 2 is a longitudinal cross section view of the hydraulic brake system similar to FIG. 1, but having a tandem master cylinder and two valve devices operating independently of each other.

In FIGS. 1, 2 and 4, the housings of the master cylinder and of the valve device are shown in outline only. The valve device may be separated from the master cylinder in a distinct housing and communicate with the master cylinder via fluid ports and lines. In order to provide an advantageously constructed master cylinder, the valve device is integrally formed within the housing 8 of the master cylinder so that part of the fluid connections from the master cylinder to the valve device may be constructed as bores in housing 8.

In FIG. 1, the valve device integrated into housing 8 of the master cylinder has been exaggerated in size to make the description and mode of operation more clearly understood.

A hydraulic booster 1 of conventional construction comprises a booster piston 2 having a coaxial blind-end bore 3 in which a central piston 5 actuatable by the brake pedal 4 slides. Booster piston 2 has on its periphery a groove 6 sealed on the right- and left-hand side by seals 7 in housing 8, so that a chamber 11 enclosed between groove 6 and housing 8 is provided. Chamber 11 is connected to a fluid accumulator 10 via a port 9. Groove 6 has radial bores 36 opening into blind-end bore 3, and central piston 5 includes radial bores 12 and 14 and largely axial channel 13. Further, blind-end bore 3 is in communication with a chamber 16 in front of booster piston 2 through an opening 15, with chamber 16 being connected to a fluid reservoir 17. Central piston 5 terminates in an enlarged section of blind-end bore 3 in which it slides in a fluid-sealed relationship thereto. This results in the formation of a fluid chamber 19 which is bounded by booster piston 2 and the enlarged section 18 of central piston 5 and receives fluid via bore 14. Enlarged section 18 is in abutment with a stop 21 in booster piston 2 in opposition to actuating direction 20. Via an opening 22, fluid chamber 19 is in communication with booster chamber 23 which is bounded by booster piston 2 and housing 8. In this arrangement, booster piston 2 is in abutment with a stop 24 so that the volume of booster chamber 23 is at a minimum with the arrangement in the inactive position.

Annular surface 25 pressurized in booster chamber 23 transmits the pressure acting on it to a master cylinder piston 26, which is mechanically coupled with booster piston 2 or constructed as an integral unit therewith, slidable in a master cylinder chamber isolated from the other fluid chambers. Master cylinder piston 26 separates master cylinder chamber into a pressure chamber 27 and an unpressurized chamber 28. Chambers 27 and 28 communicate with each other through a bore 29 in master cylinder piston 26, with the opening of bore 29 terminating in pressure chamber 27 being closed by a lip-type seal 30 sealing master cylinder piston 26 in housing 8 in a fluid-tight manner. Thus, the effect of a check valve is obtained with the arrangement permitting fluid flow solely from unpressurized chamber 28 to pressure chamber 27 while inhibiting fluid flow in the opposite direction with lip-type seal 30 intact. Pressure chamber 27 is connected to fluid reservoir 17 through a breather bore 31 terminating in pressure chamber 27 directly in front of lip-type seal 30 and unpressurized chamber 28 is connected to fluid reservoir 17 through port 32.

Booster piston 2 extends through and is sealed fluid-tight relative to wall 33 of housing 8 in opposition to actuating direction 20 and terminates in an enlarged-diameter housing section 34 in which the end of booster piston 2 slides in a fluid-tight relationship thereto. Fluid chamber 35 thereby provided, which is bounded by housing 8 and booster piston 2, is connected to unpressurized chamber 16 and fluid reservoir 17 via valve device 106. Movement of booster piston 2 in actuating direction 20 will result in a decrease in volume of pressure chamber 35, and the fluid will be urged into fluid reservoir 17 via valve device 106.

Further, booster piston 2 accommodates a travel simulator comprising two relatively slidable pistons 37 and 38 and a spring 39 inserted between these pistons. Piston 37 is in mechanical abutment with central piston 5 and piston 38 connects with brake pedal 4. The prestressed spring 39 engaged between pistons 37 and 38 transmits forces up to a specific amount so that the arrangement is regarded as mechanically rigid in this operating state, i.e., the brake pedal is directly mechanically connected with central piston 5. From the specific amount on, spring 39 will yield, and the two pistons 37 and 38 will move relative to each other and thereby increase the pedal travel of brake pedal 4. In this manner, brake pedal 4 is allowed to travel an increased distance although booster piston 2 is locked in position as will be explained hereinafter. Following a predetermined stroke, both of piston 37 and 38 will be in rigid mechanical abutment and spring 39 cannot be compressed further. Damage to spring 39 is thus precluded.

The total arrangement is maintained in its inactive position illustrated by a spring 40. Spring 40 is arranged in chamber 16 and bears upon wall 41 located between unpressurized chamber 28 of the master cylinder and unpressurized chamber 16 of the booster arrangement. This particular construction was chosen because it enables fluid reservoir 17, which is divided into two compartments 42 and 43 by a wall 107, to be allocated to the arrangement such that compartment 42 is assigned to the master cylinder, while compartment 43 is assigned to the hydraulic booster device. It is thereby ensured that in the event of a leak in the hydraulic booster system the fluid for the master cylinder cannot escape, and vice versa. Therefore, in the event of a line leakage, an emergency braking operation is at all times possible because a sufficient amount of fluid continues to be available.

Valve device 106 comprises essentially four chambers 44 to 47 arranged in series, with chamber pairs 44-45, 45-46, 46-47 being separated by walls 48 to 50 having a valve piston 51 extending therethrough in a fluid-tight relationship. Valve piston 51 terminates in chambers 44 and 47, each of its ends 52, 53 fulfilling a valve function. For this purpose, end 53 in chamber 44 is a valve cone 54 urged into sealing engagement with the opening of a channel 56 connecting with pressure chamber 27, with the opening of channel 56 into chamber 44 forming a valve seat 55.

A piston 57 separates chamber 44 into a hydraulic chamber 58 and a chamber 59 connected to atmosphere, with the pressure in hydraulic chamber 58 keeping piston 57 in abutment with a stop 61 in chamber 44 in opposition to the force of spring 60. Valve piston 51 extends through piston 57 in a fluid-tight relationship and coaxially therewith such that valve piston 51 remains displaceable relative to piston 57. However, valve cone 54 is slightly larger than the section of valve piston 51 extending through piston 57, resulting in the formation of a step 62. Piston 57 is urged into engagement by the force of spring 60 in the absence of hydraulic pressure in chamber 58.

End surface 63 of valve piston 51 includes an axial channel 64 conducting fluid from pressure chamber 27 into chambers 45 and 46 through radial channels 65 and 66. Chambers 45 and 46, are subdivided into inlet chambers 69 and 70 and control chambers 71 and 72 respectively by collars 67 and 68 sealed fluid-tight relative to housing respectively by lip-type seals 73 and 74 in inlet chambers 69 and 70. Further, collars 67 and 68 include axial through-channels 75 and 76 covered respectively by lip-type seals 73 and 74, so that they permit a fluid flow from control chambers 71 and 72 respectively to inlet chambers 69 and 70 in their function as check valves.

Control chamber 72 further accommodates a spring 108 urging valve cone 54 into engagement with valve seat 55.

End 52 of valve piston 51 in chamber 47 acts as a slide valve for inlet port 109 which communicates with fluid chamber 35 through line 113. Chamber 47 is also connected to chamber 16 and compartment 43 of fluid reservoir 17 and, via port 77 and line 78, to fluid pump 79 which also delivers fluid into fluid accumulator 10 when electric motor 80 is turned on. Connected upstream from pump 79 is a filter 81 which is to retain any particles of dirt in the hydraulic fluid. A check valve 82 prevents evacuation of fluid accumulator 10 in the event of a leak in line 83 or pump 79. If the pressure in fluid accumulator 10 is too low, a pressure switch 84 will issue a start command to pump 79 and motor 80, and will stop the pump again when the pressure has reached a predetermined magnitude.

The pressure generated in accumulator 10 also prevails in chamber 11, and actuation of brake pedal 4 causes it to be directed into chamber 19 and booster chamber 23 through the bores and channels in booster piston 2 and central piston 5, with opening 15 being closed by central piston 5. A pressure corresponding to the position of brake pedal 4 will build up in booster chamber 23 and, by transmission to master cylinder piston 26, in pressure chamber 27.

Via a line arrangement 85 and 86 and a solenoid valve 91 which is open in the de-energized state, booster chamber 23 communicates with wheel cylinders 89 and 90 of the rear axle. Accordingly, the pressure in booster chamber 23 will build up in the wheel cylinders 89 and 90 without delay. Via a solenoid valve 92 which is closed in the de-energized state and a line 93, wheel cylinders 89 and 90 are also connected to line 78 feeding fluid to pump 79 or returning the fluid to fluid reservoir 17. Line 85 further communicates via branch line 87 and check valve 88 with wheel cylinders 89 and 90 of the rear axle. However, the fluid is only allowed to flow from wheel cylinders 89 and 90 into booster chamber 23 so that in the inactive position the wheel cylinders are connected to the unpressurized fluid reservoir 17 via booster chamber 23, the channel system in booster piston 2 and central piston 5, and chamber 16. Via line 94, the booster pressure is also directed into hydraulic chamber 58.

The pressure in pressure chamber 27 will propagate to inlet chambers 69 and 70 via channels 56, 64, 65 and 66. Inlet chambers 69 and 70 are connected respectively to wheel cylinders 95 and 96 via lines 101 and 103, respectively, and solenoid valves 97 and 99 which are open in the de-energized state. The pressure in wheel cylinders 95 and 96 can be decreased through solenoid valves 98 and 100, which are closed in the de-energized state, and through line 105 which is connected to line 78, in response to control signals issued by an antiskid control system (not shown). The wheel cylinders themselves are connected to control chambers 71 and 72 of the valve device via lines 102 and 104, respectively, so that the pressure applied to wheel cylinders 95 and 96 through solenoid valves 97 to 100 also prevails in control chambers 71 and 72.

The mode of operation of the arrangement is as follows.

Under normal brake application conditions, valve device 106 has the position illustrated. The pressure supplied by the hydraulic booster prevails directly in wheel cylinders 89 and 90 of the rear axle, and via annular surface 25 the booster pressure will act in pressure chamber 27 in accordance with the effective surface ratios of booster piston 2 relative to master cylinder piston 26, this pressure propagating to wheel cylinders 95 and 96 of the front axle. If the antiskid control apparatus (not shown) signals an imminent locked condition of the rear axle, closing of valve 91 and opening of valve 92 permits fluid to be discharged from wheel cylinders 89 and 90 of the rear axle, and during another period of pressure buildup a sufficient amount of fluid volume will be available because the fluid in booster chamber 23 cannot become exhausted. Via the channels in booster piston 2 and in central piston 5, sufficient fluid will be supplied from fluid accumulator 10 into booster chamber 23.

If the antiskid control apparatus executes a pressure decrease to avoid locking of a front wheel, the pressure decrease in wheel cylinder 95, for example, will result in the adjusted pressure prevailing also in control chamber 71. Because in this operating state valve 97 which is open when de-energized is closed, the full pressure of pressure chamber 27 will prevail in chamber 69, while the reduced pressure of wheel cylinder 95 will prevail in chamber 71. The differential of pressure will cause a force to act on collar 67 which displaces valve piston 51 to the right, thereby lifting valve cone 54 clear of valve seat 55. The dynamic pressure of hydraulic booster 1 supplied to hydraulic pressure chamber 58 via line 94 is thus directly fed into pressure chamber 27 and, via channels 64, 65 and 66 into inlet chambers 69 and 70. Displacement of valve piston 51 will cause its end 52 in chamber 47 to cut off inlet port 109 of pressure chamber 35, so that booster piston 2 is hydraulically locked in position in the actuating direction. Thus, any further increase in the force applied to brake pedal 4 would only result in a fully opened condition of the control mechanism of hydraulic booster 1, thus it acts as a brake control valve in this position.

With the application of force continuing, a travel is simulated to brake pedal 4 by simulator 37, 38, 39 which is accomplished by compression of spring 39.

When the front-axle wheel concerned has recovered from the imminent locked condition, the pressure in wheel cylinder 95 will be built up again by opening of solenoid valve 97. Thus, the pressure in control chamber 71 will also again approximate the pressure in inlet chamber 69. The force acting on collar 67 and keeping valve piston 51 in the open position will be reduced. When the pressure in wheel cylinder 95 has largely approached the pressure in inlet chamber 69 again, the force of spring 108 will again move valve piston 51 into the inactive position illustrated, and valve cone 54 will be urged into sealing engagement with valve seat 55, so that chamber 58 is again isolated from pressure chamber 27. At the same time, inlet 109 of the line communicating with chamber 35 is again open so that booster piston 2 again becomes movable.

This mode of operation of the arrangement ensures that the fluid discharged through valves 98 and 100 in the presence of an antiskid control operation does not cause exhaustion of the volume of pressure chamber 27, because during the period of fluid discharge pressure chamber 27 is connected to the fluid flow of hydraulic booster 1 via valve device 106, which fluid cannot become exhausted because of the arrangement of pump 79 and fluid accumulator 10. When the fluid discharged via valves 98 and 100 has been recovered again in pressure chamber 27 by means of the dynamic fluid circuit of hydraulic booster 1, valve device 106 will close again and the dual-circuit brake system is again split into a static circuit receiving its fluid from pressure chamber 27 and a dynamic circuit receiving its fluid from hydraulic booster 1.

By the hydraulic blocking of chamber 35 it is ensured that master cylinder piston 26 is not moved in the actuating direction in the sense of reducing the volume of pressure chamber 27 when the pressure drops abruptly in pressure chamber 27 as may be the case, for example, when valves 97 and 99 open simultaneously following a pressure decrease. Thus, the static brake circuits holds a constant fluid volume, irrespective of the number of control cycles performed at wheel cylinders 95 and 96 of the front axle.

FIG. 3 shows that the point at which a marked pressure increase sets in in pressure chamber 27 is at about 40 bar while the pedal travel is becoming smaller. This occurs likewise under the control of valve device 106. Assuming an uncontrolled braking, the pressure in pressure chamber 27 will act on end surface 63 of valve piston 51. This force acts in opposition to spring 108, which thus determines the pressure level causing displacement of valve piston 51. In the embodiment shown, the point at which this condition sets in has been fixed at 40 bar by way of example. When this valve of pressure is reached valve cone 54 will then lift clear of valve seat 55 and connect the until then static brake circuit directly to the dynamic brake circuit of hydraulic booster 1. In this state, hydraulic booster piston 2 will be hydraulically locked in place likewise by interlocking of chamber 35, so that brake pedal 4 travel can only be produced by simulator 37, 38, 39 when central piston 5 has already bottomed in blind-end bore 3. This would have the advantage of the vehicle operator having available a relatively large brake pedal travel up to 40 bar, permitting him a proportional brake application. However, if he requires a pressure exceeding 40 bar which initiates a stronger or panic brake application, the system will be switched to a brake pressure control valve after the pressure has reached 40 bar, the brake pressure control valve comprising booster piston 2, central piston 5 and their relevant channels. The distance which the brake pedal travels in this case has been kept very small deliberately so that even under panic braking conditions the vehicle operator is not required to cover an excessive pedal travel.

Moreover, in the event of a failure of the hydraulic brake system, the possibility for the vehicle operator to initiate an emergency braking action is at all times ensured. For instance, if the hydraulic system of the booster fails, he can actuate master cylinder piston 26 directly through brake pedal 4 and cause a pressure to develop which exceeds 40 bar by far, because in the event of failure of hydraulic booster pressure, spring 60 will keep piston 57 in abutment with step 62 of the valve piston. Spring 60 may be so designed that the pressure to be built up at wheel cylinders 95 and 96 of the front axle is sufficient to bring the vehicle to a stop within a reasonable braking distance. Because valve piston 51 is maintained in the position shown, it need not be feared that booster piston 2 becomes hydraulically locked in position, making a further pressure increase in pressure chamber 27 impossible.

On the other hand, if the static brake system fails because of leakage of lip-type seal 30, pressure is not allowed to build up in pressure chamber 27 and, consequently, valve piston 51 cannot be displaced in opposition to the force of spring 108. The hydraulic force supplied in such a case will act solely on wheel cylinders 89 and 90 of the rear axle, ensuring likewise an emergency braking operation.

With the whole arrangement in the inactive position, it is further ensured that all wheel cylinders are directly connected to unpressurized fluid reservoir 17. In this arrangement, wheel cylinders 95 and 96 are pressure-balanced via line 102 and 104 and check valves 74, 76 and 73, 75 and wheel cylinders 89 and 90 via check valve 88.

For a still better safety, a brake system of this type may also include a tandem master cylinder as shown in FIG. 2. This construction necessitates, however, the provision of a separate valve device 106.1, 106.2 for each pressure chamber 27.1, 27.2. The valve devices correspond largely to the one of FIG. 1, they are, however, equipped only with respective inlet chambers 70.1, 70.2 and respective outlet chambers 72.1, 72.2. Thus, each valve device is assigned a closure spring 108.1, 108.2 of its own which determines the pressure at which the associated static system changes over to the dynamic system. In chambers 47.1 and 47.2 the ends of valve pistons 51.1 and 51.2 act again as valve closure members in order to shut off the inlets 109.1 and 109.2 of the line communicating with chamber 35. In this arrangement, it is to be noted that chamber 47.1 is connected to port 110 of unpressurized chamber 16 via port 112 and line 114, while chamber 47.2 is connected to port 110 of unpressurized chamber 16 via port 111 and the same line 114. The arrangement is interconnected such that chamber 35 is linked to chamber 16 via two parallel lines. The purpose of this arrangement is to achieve locking of hydraulic booster piston 2 only if the change-over pressure has been attained in the two pressure chambers 27.1 and 27.2. If the change-over pressure prevails in one pressure chamber only, booster piston 2 can be displaced further because a connection between fluid chamber 35 and fluid reservoir 17 is still open.

The tandem master cylinder includes a floating piston 26.2 which is actuated by the hydraulic column in pressure chamber 27.2. Provided between master cylinder piston 26.1 and floating piston 26.2 is an arrangement comprising a spring 115, a pin 116 including a head and secured to master cylinder piston 26.1, a cup-shaped structure 117 having pin 116 extending through its bottom and being held in abutment with the rear surface of the head by the force of spring 115. In this manner, spring 115 is anchored to piston 26.1, while the cup remains displaceable relative to piston 26.1 in the sense of compressing spring 115. Via a spring 118 which is disposed in pressure chamber 27.1, floating piston 26.2 is held in abutment with the arrangement comprising spring 115, pin 116 and cup 117. In this arrangement, spring 118 is so constructed that it will not compress spring 115 in the inactive position shown. Floating piston 26.2 forms at the same time a boundary for an unpressurized chamber 28.1, in the same manner as piston 26.1 bounds an unpressurized chamber 28.2. The mode of operation and the connections to the associated fluid chambers correspond to those of FIG. 1.

Fluid reservoir 17 includes two walls 107.1 and 107.2 subdividing it into three compartments 42.1, 42.2 and 43. Compartment 43 connects to chamber 16, compartment 42.1 communicates on the one hand with chamber 28.2 while supplying fluid to pressure chamber 27.2 through breather bore 31.2, and compartment 42.2 is connected to fluid chamber 28.1 via a port and supplies fluid to pressure chamber 27.1 through breather bore 31.1.

The mode of operation of this arrangement will not be described in greater detail because it corresponds identically to that of FIG. 1. If the pressure in the wheel cylinder associated with the pressure chamber is lowered as a result of a control signal from the antiskid control apparatus, the relevant pressure chamber will be connected to the hydraulic fluid circuit. However, a locked condition of hydraulic booster piston 2 will not occur because it has to remain displaceable for another pressure increase in the other fluid chamber.

FIG. 4 shows the brake system of FIG. 1 with the valve device slightly changed. Accordingly, the major part of the reference numerals are identical with those of FIG. 1.

The hydraulic booster 1 is of identical design, except for a warning device 130 connected thereto in pressure inlet chamber 11 to indicate a failure of the hydraulic fluid circuit. Further, wall 41 has been omitted because, as will be described in more detail hereinafter, it is intended to slightly change the fluid supply compared to the embodiment of FIG. 1.

Valve piston 51 of the valve device is of slightly different design. End 52 is constructed as a valve cone adapted to be urged into engagement with a projection in chamber 47 forming a valve seat 119. A spring 127 disposed coaxially in a bore in end 52 of valve piston 51 and bearing against the bottom of chamber 47 maintains valve cone 52 clear of valve seat 119, keeping the valve open. Thus, the fluid flowing from chamber 35 into inlet 109 through line 113 is allowed to pass the valve and reach unpressurized chamber 16 through a line and port 110.

End 53 of valve piston 51 is likewise of different construction. Chamber 44 has a reduced-diameter section 128 and end 53 of valve piston 51 extending from valve cone 54 slides in and is sealed to section 128. Fluid chamber 121 thus bounded by the housing and valve piston 51 communicates with pressure chamber 27 of the master cylinder which is likewise connected to wheel cylinders 95 and 96 through lines 101 and 103, respectively, and solenoid valves 97 and 99, respectively, which are open in the de-energized state. Thereby end surface 63 of valve piston 51 is acted upon by the pressure of pressure chamber 27. At the same time, end 53 includes channels 64, 65 and 66 enabling the fluid of pressure chamber 27 to be fed into inlet chambers 69 and 70 directly. Control chambers 71 and 72 allocated to the inlet chambers in turn communicate directly with the associated wheel cylinders 95 and 96 through lines 102 and 104, respectively. The step in chamber 44 adjacent reduced-diameter section 128 is constructed as a valve seat 120. Valve cone 54 is urged into sealing engagement with valve seat 120 and held in this position by spring 127. Chamber 58 which receives the pressure of hydraulic booster 1 through line 94 is thus in fluid-tight isolation relative to the remaining space of chamber 44, with the remaining space connecting via a port to a chamber 123 provided between master cylinder piston 26 and housing 8. Chamber 123 is provided by a groove 122 in master cylinder piston 26, groove 122 being closed on the right- and left-hand side by seals, thereby sliding in housing 8 in fluid-tight engagement therewith. The left-hand shoulder of groove 122 which separates chamber 123 from pressure chamber 27 has a through bore 29 which is covered by lip-type seal 30 in pressure chamber 27, thereby providing a check valve between chamber 123 and pressure chamber 27.

Breather bore 31 terminating in front of lip-type seal 30 and inlet 32 charging pressure chamber 123 with unpressurized fluid open into a chamber 124 which is connected to compartment 43 of fluid reservoir 17 through a port 126. Arranged in chamber 129 is a tip-change valve 125 against which a spring 124 bears in the closing direction. Tip-change valve 125 is held in the open position by the left-hand shoulder of groove 122 so that with the brake system in the inactive state unpressurized fluid is allowed to flow from compartment 42 into chamber 124, thereby supplying fluid to the pressure chambers connected thereto.

As already described, a suitable pressure will be built up in the wheel cylinders when the brake system is activated. When displacement of master cylinder piston 26 has taken place, tip-change valve 125 will be moved into the closed position by the force of spring 124, so that inlet port 126 into chamber 124 will be closed. Lip-type seal 30 will have overtraveled breather bore 31 so that chamber 124 communicates with pressure chamber 123 solely via port 32.

If an imminent locked condition of the front wheels is detected, the pressure in the associated wheel cylinders 95 and 96 will be discharged, resulting in turn in opening of the valve device and hydraulic locking of booster piston 2. The fluid from the dynamic circuit is allowed to flow through line 94, chamber 58 and the open valve into chamber 123 where it is supplied to the associated wheel cylinders through channels 29, past lip-type seal 30 and through pressure chamber 27. Because tip-change valve 125 in chamber 129 is closed, the fluid under pressure cannot escape into fluid reservoir 17. When the pressure in the associated wheel cylinders 95 and 96 has again adjusted itself to the master cylinder pressure, valve piston 51 will again be displaced by the force of spring 127, and the hydraulic fluid flow will be shut off. A pressure-balancing action will take place between chamber 123 and pressure chamber 27 until the pressure in pressure chamber 27 is adjusted to the pressure in pressure chamber 123.

In this embodiment, too, the valve device will connect the static circuit directly to the dynamic circuit after a specific pressure level is reached. This changeover pressure is determined by the pressure on end surface 63 of valve piston 51 and by spring 127 counteracting this force.

In arrangements of this type it is worth mentioning that the static brake circuit can be checked at all times although the system is controllable by the dynamic fluid circuit of booster 1. For example, if lip-type seal 30 of master cylinder piston 26 is defective, it is not possible to build up a pressure sufficient to cause switching of the valve device to the dynamic fluid circuit. A failure of lip-type seal 30 will make itself felt by an increased brake pedal travel. Nevertheless, the emergency braking capability of the system will be maintained because, following overcoming of a suitable lost travel, the pressure valve in the hydraulic booster can be opened fully, with the pressure thus directed into booster chamber 23 traveling down to wheel cylinders 89 and 90 of the rear axle.

If the brake system is equipped with a tandem master cylinder, the valve device may be designed such that only the pressure in one master cylinder pressure chamber will govern the change-over to the dynamic circuit. Each master cylinder may be assigned a control chamber of its own in the valve device.

Where two valve devices are provided, it will be sufficient if only one valve device at a time locks the booster piston hydraulically. In such an arrangement, the valve devices may be interconnected so as to be capable of hydraulically locking the booster piston in the sense of a series connection.

In order not to impair the valve function, the valve travels should be kept small. Thus, it is ensured that volume displacements do not cause fluctuations of pressure.

While I have described above the principles of my invention in connection with specific apparatus it is to be clearly understood that this description is made only by way of example and not as a limitation to the scope of my invention as set forth in the objects thereof and in the accompanying claims.

I claim:
1. A hydraulic brake system comprising:
a master brake cylinder having a pressure chamber and a master cylinder piston;
a brake booster having a booster piston coupled to said master cylinder piston to pressurize said pressure chamber;
wheel brake cylinders;
antiskid control apparatus including solenoid valves coupled to said wheel cylinders to control, in the event of an imminent locked condition of a wheel, the pressure in an associated one of said wheel cylinders independently of the pressure in said pressure chamber;
a valve device coupled to said pressure chamber, said brake booster, certain ones of said solenoid valves and certain ones of said wheel cylinders, said valve device being opened dependent on a differential of pressure between the pressure in said pressure chamber and said certain ones of said wheel cylinders, the pressure in said certain ones of said wheel cylinders being lower than the pressure in said pressure chamber by a predetermined amount, said valve device interrupting a fluid connection between a fluid chamber associated with one of said booster piston and an unpressurized fluid reservoir, when said valve device is opened, said fluid chamber being disposed relative to said one end of said booster piston such that said booster piston reduces the volume of said fluid chamber when moved in an actuating direction.
2. A system according to claim 1, wherein
said valve device includes a stepped valve piston movably arranged in a valve housing disposed parallel to a master brake cylinder housing.
3. A system according to claim 2, wherein
said booster piston is disposed in said master cylinder housing in tandem relationship with said master cylinder piston.
4. A system according to claim 3, wherein
said valve housing is integral with said master cylinder housing.
5. A system according to claim 2, wherein
said valve housing is integral with said master cylinder housing.
6. A system according to claims 3 or 4 wherein
said valve housing is subdivided into a plurality of chambers disposed in series axially by a plurality of transverse partition walls, and
said valve piston extends through each of said plurality of partition walls in a sealed relation thereto, one end of said valve piston extending into a first of said plurality of chambers and the other end of said valve piston extending into a last of said plurality of chambers.
7. A system according to claim 6, wherein
said valve piston includes at least two collars extending therefrom, each of said two collars dividing a different one of two intermediate ones of said plurality of chambers into an inlet chamber communicating with said pressure chamber and a control chamber communicating with an associated one of said certain ones of said wheel cylinders.
8. A system according to claim 7, further including
a check valve disposed between each of said inlet chambers and each of said outlet chambers opening in the direction of said inlet chamber.
9. A system according to claim 8, wherein
each of said check valves includes an axial bore in an associated one of said two collars connecting an associated one of said inlet chambers to an associated one of said control chambers, and a lip seal disposed in an associated one of said inlet chambers to cover the opening of said axial bore in the associated one of said inlet chambers and to seal said associated one of said two collars to the inner wall of said valve housing.
10. A system according to claim 9, wherein
each of said inlet chambers is connected to said pressure chamber via channels formed in said valve piston.
11. A system according to claim 10, wherein
said certain ones of said wheel cylinders number two, and each of said two wheel cylinders is coupled to a different one of said inlet chambers by a different one of said solenoid valves.
12. A system according to claim 11, wherein
an inlet opening coupled to said pressure chamber disposed in said first of said plurality of chambers is constructed as a valve seat, and
said valve piston includes means to seat in said valve seat to close said inlet opening.
13. A system according to claim 12, wherein
said means is disposed on said one end of said valve piston.
14. A system according to claim 12, wherein
said means is disposed spaced from said one and of said valve piston.
15. A system according to claim 12, wherein
said last of said plurality of chambers is connected to said fluid chamber and to said reservoir, and
said other end of said valve piston is capable of closing an inlet aperture in said last of said plurality of chambers connected to said fluid chamber.
16. A system according to claim 15, wherein
said valve piston acts as a slide valve closing said inlet aperture when said valve piston is moved axially.
17. A system according to claim 16, wherein
said other end of said valve piston is capable of closing an outlet aperture in said last of said plurality of chambers connected to said reservoir.

18. A system according to claim 17, wherein
said first of said plurality of chambers includes therein a piston defining therebetween and an end wall of said valve housing a hydraulic chamber coupled to said brake booster, and a spring acting on said piston in opposition to pressure in said hydraulic chamber, and
said valve piston extends axially through said piston in a axially slidable, sealed relationship therewith, said one end of said valve piston having a larger diameter than the diameter of that section of said valve piston extending through said piston.

19. A system according to claim 18, wherein
said first of said plurality of chambers includes therein a stop against which said piston abuts when acted upon by pressure from said brake booster.

20. A system according to claim 19, wherein
said piston defines a chamber in said first of said plurality of chambers disposed between said piston and an adjacent one of said plurality of partition walls, and
said spring is disposed in said chamber between said piston and said adjacent one of said plurality of partition walls.

21. A system according to claim 9, wherein
said certain ones of said wheel cylinders number two, and each of said two wheel cylinders is coupled to a different one of said control chambers.

22. A system according to claim 21, wherein
said valve piston carries an additional collar in the area of said first of said plurality of chambers spaced from the adjacent end of said valve piston, said additional collar being constructed as a valve cone in a seating relationship with a valve seat provided by a wall of said first of said plurality of chambers spaced from an associated one of said plurality of partition walls, said valve seat and said valve cone cooperating to interrupt fluid flow to said pressure chamber.

23. A system according to claim 22, wherein
said valve cone is pressure balanced.

24. A system according to claim 22, wherein
that section of said valve piston between said valve cone and said adjacent end of said valve piston slides in said valve housing in a sealed relationship thereto, and said adjacent end of said valve piston is a boundary of a first chamber connected to and pressurized by said pressure chamber.

25. A system according to claim 24, wherein
said master cylinder piston includes a second chamber disposed in the outer surface thereof, said second chamber being connected to said first of said plurality of chambers and through an additional check valve to said pressure chamber, said additional check valve opening in the direction of said pressure chamber.

26. A system according to claim 25, wherein
said second chamber is connected to said reservoir in the inactive position of said master cylinder piston by a valve actuated by said master cylinder piston.

27. A system according to claim 26, wherein
said valve is a tip-change valve acted upon in the closing direction by a spring 28. A system according to claim 27, further including an additional spring disposed in a coaxial closed bore in said other end of said valve piston and bearing against an adjacent end wall of said valve housing to determine a change-over pressure for said valve device.

29. A system according to claim 20, further including
an additional spring disposed in one of said control chambers between an associated one of said two collars and an adjacent one of said plurality of partition walls to determine a change-over pressure for said valve device, said additional spring keeping said means seated in said valve seat until said change-over pressure is achieved.

30. A system according to claim 11, wherein
said last of said plurality of chambers is connected to said fluid chamber and to said reservoir, and
said other end of said valve piston is capable of closing an inlet aperture in said last of said plurality of chambers connected to said fluid chamber.

31. A system according to claim 30, wherein
said valve piston acts as a slide valve closing said inlet aperture when said valve piston is moved axially.

32. A system according to claim 31, wherein
said other end of said valve piston is capable of closing an outlet aperture in said last of said plurality of chambers connected to said reservoir.

33. A system according to claim 11, wherein
said first of said plurality of chambers includes therein a piston defining therebetween and an end wall of said valve housing a hydraulic chamber coupled to said brake booster, and a spring acting on said piston in opposition to pressure in said hydraulic chamber, and
said valve piston extends axially through said piston in an axially slidable, sealed relationship therewith, said one end of said valve piston having a larger diameter than the diameter of that section of said valve piston extending through said piston.

34. A system according to claim 33, wherein
said first of said plurality of chambers includes therein a stop against which said piston abuts when acted upon by pressure from said brake booster.

35. A system according to claim 34, wherein
said piston defines a chamber in said first of said plurality of chambers disposed between said piston and an adjacent one of said plurality of partition walls, and
said spring is disposed in said chamber between said piston and said adjacent one of said plurality of partition walls.

36. A system according to claim 6, wherein
an inlet opening coupled to said pressure chamber disposed in said first of said plurality of chambers is constructed as a valve seat, and
said valve piston includes means to seat in said valve seat to close said inlet openings.

37. A system according to claim 36, wherein
said means is disposed on said one end of said valve piston.

38. A system according to claim 36, wherein
said means is disposed spaced from said one end of said valve piston.

39. A system according to claim 6, wherein
said last of said plurality of chambers is connected to said fluid chamber and to said reservoir, and
said other end of said valve piston is capable of closing an inlet aperture in said last of said plurality of chambers connected to said fluid chamber.

40. A system according to claim 39 wherein
said valve piston acts as a slide valve closing said inlet aperture when said valve piston is moved axially.

41. A system according to claim 40 wherein
said other end of said valve piston is capable of closing an outlet aperture in said last of said plurality of chambers connected to said reservoir.

42. A system according to claim 6, wherein
said first of said plurality of chambers includes therein a piston defining therebetween and an end wall of said valve housing a hydraulic chamber coupled to said brake booster, and a spring acting on said piston in opposition to pressure in said hydraulic chamber, and
said valve piston extends axially through said piston in an axially slidable, sealed relationship therewith, said one end of said valve piston having a larger diameter than the diameter of that section of said valve piston extending through said piston.

43. A system according to claim 42 wherein
said first of said plurality of chambers includes therein a stop against which said piston abuts, when acted upon by pressure from said brake booster.

44. A system according to claim 43, wherein
said piston defines a chamber in said first of said plurality of chambers disposed between said piston and an adjacent one of said plurality of partition walls, and
said spring is disposed in said chamber between said piston and said adjacent one of said plurality of partition walls.

45. A system according to claim 6, further including
a spring disposed in a coaxial closed bore in said other end of said valve piston and bearing against an adjacent end wall of said valve housing to determine a change-over pressure for said valve device.

46. A system according to claim 7, further including
a spring disposed in one of said control chambers between an associated one of said two collars and an adjacent one of said plurality of partition walls to determine a change-over pressure for said valve device.

47. A system according to claim 1, further including
an additional master piston and an additional pressure chamber disposed in said master cylinder to provide a tandem master brake cylinder, and
an additional valve device identical with said valve device, said valve device being coupled to said pressure chamber, said additional valve device being coupled to said additional pressure chamber and said valve device and said additional valve device being coupled in parallel to said fluid connection.

* * * * *